UNITED STATES PATENT OFFICE.

RICHARD FRIEDRICH, OF GLÖSA, NEAR CHEMNITZ, GERMANY, AND FRIEDRICH HIRSCH, OF VIENNA, AUSTRIA-HUNGARY.

PROCESS OF MAKING SODIUM SULFITE AND AMMONIUM CHLORID.

957,761.      Specification of Letters Patent.     Patented May 10, 1910.

No Drawing.     Application filed May 27, 1909. Serial No. 498,786.

*To all whom it may concern:*

Be it known that we, RICHARD FRIEDRICH, Ph. D., chemist, and FRIEDRICH HIRSCH, Ph. D., chemist, subjects, respectively, of the King of Prussia and the Emperor of Austria-Hungary, residing, respectively, at Glösa, near Chemnitz, Germany, and Vienna III, Praterstrasse 33, Austria-Hungary, have invented certain new and useful Improvements in Processes of Manufacturing Sodium Sulfite and Ammonium Chlorid, of which the following is a specification.

The present invention relates to a process for the direct preparation of sodium sulfite and ammonium chlorid by decomposing sodium chlorid with ammonium sulfite and separating the resulting sodium sulfite in the anhydrous conditon.

Our improved process of manufacturing sodium sulfite and ammonium chlorid consists in decomposing sodium chlorid by nascent ammonium sulfite and this process aims at greater simplicity in carrying it out, and is therefore much cheaper and quicker than the older processes.

According to the present invention, common salt is dissolved in water, or merely suspended therein, and gaseous sulfur dioxid, and ammonia, in molecular proportions, are passed into this liquid. The introduction of the two gases may be effected either simultaneously or in any desired order. It has been found, in this connection, that the considerable amount of heat disengaged during the reaction, heats the liquid so strongly that the readily soluble sodium sulfite produced by transformation is converted into the sparingly soluble anhydrous form and is deposited for the most part spontaneously from the solution.

The following examples of the way of carrying out the process will serve to illustrate the invention:

Example I: Into a suspension of 180 parts of water and 120 parts of common salt there is introduced, first, a little sulfur dioxid, and then sulfur dioxid and gaseous ammonia together, in approximately equivalent proportions, the liquid being kept slightly acid, up to nearly the close of the reaction, in order to prevent loss of ammonia. Finally, the supply of gas is regulated in such a manner that the liquid becomes neutral, and the proportion of sulfur dioxid contained in the clear neutral liquor will be about 9 or 10 grams of sulfur dioxid in 100 cubic centimeters of liquor. The liquid, which has become warmed through the heat of the reaction to a temperature ranging at a minimum between 50° and 70° C., but preferably between 85° and 90° C., is separated from the precipitated sodium sulfite while still hot, and is cooled to 35°–40° C. for the precipitation of the ammonium chlorid.

Example II: Into 370 parts of a mother liquor showing the specific gravity 1.231 at 30° C. and containing 36.9 parts of $Na_2SO_3$, 87.7 parts of $NH_4Cl$, 4 parts of $Na_2SO_4$ and almost 240 parts of water are introduced, first, 60 parts of common salt, and then 20 parts of gaseous ammonia and 36 parts of sulfur dioxid. The liquor, which has become very hot, is separated, while still hot, from the anhydrous sodium sulfite and is cooled down to almost 35° C. for the separation of the ammonium chlorid. It is necessary to separate the liquor as quickly as possible while at its highest temperature from the anhydrous sodium sulfite, in order to prevent the ammonium chlorid from crystallizing, since the ammonium chlorid, when permitted to cool in the presence of anhydrous sulfite, solidifies and is difficult to remove even with large quantities of washing liquids. We have found in practice that the lowest temperature at which the separation can satisfactorily be made is between 50° and 70° C., but that the best results can be obtained at temperatures above 80° C. We have, however, obtained satisfactory results at temperatures as high as 112° C., the boiling point of the saturated ammonium chlorid solution. The higher the temperature becomes the greater the amount of ammonium chlorid that can be produced, and consequently the greater the amount of common salt that can be employed. After the addition of the required quantity of common salt, sulfur dioxid and ammonia gas are introduced either simultaneously or in any desired order, until the transformation has been performed.

It is true that a method is known for preparing sodium sulfite from common salt and ammonium sulfite, in which a saturated solution of solid, crystallized ammonium sulfite is treated with common salt, the solution being heated, and the precipitate of sodium sulfite, obtained while warm, separated.

The process forming the subject of the present invention differs from the previous one just referred to, by the employment of nascent ammonium sulfite, instead of the finished ammonium salt, the expensive preparation and isolation of the latter being therefore obviated. On the other hand, in the new process, the circumstance that ammonium sulfite is not present to as great a degree in the solution which has been warmed by the heat of the reaction, permits of the use of far more concentrated solutions of salt and even of a suspension of common salt in water, since the solvent capacity of the liquid is to some extent constantly renewed during the reaction. Furthermore, when crystallized ammonium sulfite is used, the volume of liquid is disadvantageously increased by the water of crystallization, combined with this salt (about 13½ per cent. of its weight), also entering the reaction liquid. This is avoided by the new process. Lastly, no artificial or extraneous heating is necessary in the new process, the heat developed during the reaction being alone used for heating the reagent mixture. This also effects a considerable saving.

A process is also known, in which neutral sodium sulfite is prepared by passing sulfur dioxid into an ammoniacal solution of common salt, the liquid being cooled down to 15° C. and then treated with dry gaseous ammonia introduced in excess. This process is uneconomical, and differs fundamentally from the present, inasmuch as the autoheating of the liquid so favorable to the separation of the anhydrous sodium sulfite, is artificially prevented, so that the recovery of the sodium sulfite can only be effected on the subsequent addition of a hydroscopic medium, namely, the dry ammonia gas introduced in excess. Hence, the most favorable conditions for the reaction in question have not hitherto been known; and indeed the application of high temperatures was regarded as a thing to be avoided as being a cause of reversal of the reaction with reformation of the original materials. The recognition of the fact that the heat disengaged by the reaction effects the deposition of the sodium sulfite in the simplest manner, first led to the present rational process.

What we claim as our invention and desire to secure by Letters Patent is:—

1. A process for the manufacture of sodium sulfite and ammonium chlorid consisting in decomposing sodium chlorid by nascent ammonium sulfite in the presence of the heat generated by the reaction.

2. A process for the manufacture of sodium sulfite and ammonium chlorid consisting in adding to salt and water, substances which will act together to form ammonium sulfite within the salt and water and separating out the sodium sulfite and ammonium chlorid resulting therefrom, the solution being kept acid until near the close of the reaction when the solution is made neutral.

3. A process for the manufacture of sodium sulfite and ammonium chlorid, consisting in passing into salt and water, a plurality of substances which will act together therein so as to form ammonium sulfite maintaining the solution at the increased temperature incident to the resulting reaction, and then separating out the resulting sodium sulfite and ammonium chlorid.

4. A process for the manufacture of sodium sulfite and ammonium chlorid, consisting in adding to salt and water, substances which will act together therein so as to form ammonium sulfite, maintaining the solution at such a degree of heat incident to the reaction as to convert the readily soluble sodium sulfite resulting therefrom into less readily soluble sodium sulfite.

5. A process for the manufacture of sodium sulfite and ammonium chlorid, consisting in adding to salt and water, substances which act together to form ammonium sulfite which latter will decompose the salt so as to form the sodium sulfite and ammonium chlorid, sufficient heat being generated thereby to convert the readily soluble sodium sufite into less soluble sodium sulfite, and then separating out said sodium sulfite and subsequently separating out the ammonium chlorid.

6. A process of manufacture of sodium sulfite and ammonium chlorid consisting in introducing sulfur dioxid and gaseous ammonia into sodium chlorid and water and maintaining the solution during the resulting reaction at a temperature sufficient to distil off the water from the crystallized sulfite.

7. A process of manufacture of sodium sulfite and ammonium chlorid consisting in introducing sulfur dioxid and ammonia into sodium chlorid and water so as to form ammonium sulfite, decomposing the sodium chlorid thereby, the solution being maintained during the reaction at an increased temperature incident to such reaction, and then separating out the sodium sulfite and ammonium chlorid resulting therefrom.

8. A process of manufacture of sodium sulfite and ammonium chlorid consisting in bringing sodium chlorid and water together, decomposing said sodium chlorid by the introduction of sulfur dioxid and ammonia so as to form ammonium sulfite for effecting said decomposition, and at the same time generating by said chemical reaction such heat as to precipitate the sodium sulfite by reducing its solubility.

In testimony whereof we have hereunto set our hands in presence of two subscribing witnesses.

RICHARD FRIEDRICH.
FRIEDRICH HIRSCH.

Witnesses for R. Friedrich:
  WILLIAM J. KONJETSUY,
  WILLIAM WASHINGTON BRUNSWICK.

Witnesses for F. Hirsch:
  ROBERT W. HEINGARTNER,
  AUGUST FUGGER.